(12) United States Patent
Yamasani et al.

(10) Patent No.: US 8,179,370 B1
(45) Date of Patent: May 15, 2012

(54) PROXIMITY BASED KEYSTROKE RESOLUTION

(75) Inventors: Amith Yamasani, San Jose, CA (US); Simon Arscott, San Francisco, CA (US)

(73) Assignee: Google Inc., Mountain View, CA (US)

( * ) Notice: Subject to any disclaimer, the term of this patent is extended or adjusted under 35 U.S.C. 154(b) by 267 days.

(21) Appl. No.: 12/703,020

(22) Filed: Feb. 9, 2010

(51) Int. Cl.
*G06F 3/02* (2006.01)
*G09G 5/00* (2006.01)

(52) U.S. Cl. ........................ 345/168; 345/169

(58) Field of Classification Search .................. 345/168, 345/169, 156, 157; 400/472; 340/407.1; 341/21
See application file for complete search history.

(56) References Cited

U.S. PATENT DOCUMENTS

| | | | |
|---|---|---|---|
| 4,937,778 A | 6/1990 | Wolf et al. | |
| 5,557,686 A | 9/1996 | Brown et al. | |
| 6,047,300 A | 4/2000 | Walfish et al. | |
| 6,323,846 B1 | 11/2001 | Westerman et al. | |
| 6,677,932 B1 | 1/2004 | Westerman | |
| 7,088,845 B2 | 8/2006 | Gu et al. | |
| 7,098,896 B2 | 8/2006 | Kushler et al. | |
| 7,206,938 B2 | 4/2007 | Bender et al. | |
| 7,277,088 B2 | 10/2007 | Robinson et al. | |
| 7,496,842 B2 | 2/2009 | Chang | |
| 2002/0196163 A1 | 12/2002 | Bradford et al. | |
| 2004/0140956 A1 | 7/2004 | Kushler et al. | |
| 2007/0240045 A1 | 10/2007 | Fux et al. | |

OTHER PUBLICATIONS

Lesher, G.W. et al., "Optimal Character Arrangements for Ambiguous Keyboards", IEEE Trans Rehabil Eng, [online] (Dec. 1998) [retrieved on Jul. 18, 2011]. Retrieved from: <URL: http://www.ncbi.nlm.nih.gov/pubmed/9865889>, 2 pages.

Goodman, Joshua, et al., "Language Modeling for Soft Keyboards", American Association for Artificial Intelligence, [online] (2002) [retrieved on Jul. 18, 2011]. Retrieved from: <URL: http://74.125.113.132/search?q=cache:P-Syd3LXnMkJ:research.microsoft.com/en-us/um/people/joshuago/aaai-final.ps,> 8 pages.

"As U Type", [online] (Feb. 2009) [retrieved on Jul. 18, 2011]. Retrieved from: <URLhttp://web.archive.org/web/20090209045319/http://asutype.com/?>, 2 pages.

"Keystroke Dynamics", Wikipedia, [online] (Feb. 2008) [retrieved on Jul. 18, 2011]. Retrieved from: <URL: http://web.archive.org/web/20080220141730/http:/en.wikipedia.org/wiki/Keystroke_dynamics>, 2 pages.

"Using AutoCorrect", Wiki.Services, [online] (May 27, 2008) [retrieved on Jul. 18, 2011]. Retrieved from: <URL: http://wiki.services.openoffice.org/wiki/Documentation/OOoAuthors_User_Manual/Getting_Started/Using_AutoCorrect>, 2 pages.

"Goldtouch", Goldtouch.com [online] (Jul. 4, 2009) [retrieved on Jul. 18, 2011]. Retrieved from: <URL: http://web.archive.org/web/20090704082501/http:/www.goldtouch.com/>, 2 pages.

(Continued)

*Primary Examiner* — Ricardo L Osorio
(74) *Attorney, Agent, or Firm* — Fish & Richardson P.C.

(57) ABSTRACT

Methods, systems, and apparatus, including computer programs encoded on computer storage media, for resolving keystrokes. One of the methods includes receiving a first keystroke and a second keystroke input by a user on a keyboard. The first keystroke corresponds to a first key on the keyboard and the second keystroke corresponds to a second key on the keyboard that is different from the first key. The first keystroke and the second keystroke are determined to have been input at substantially the same time and the first key is determined to be adjacent the second key on the keyboard. In response to the determinations, a suggestion is generated that only one of the two keystrokes was intended to be input.

18 Claims, 7 Drawing Sheets

OTHER PUBLICATIONS

"Goldtouch", Goldtouch.com/t-products [online] (Jul. 4, 2009) [retrieved on Jul. 18, 2011]. Retrieved from: <URL; http://www.goldtouch.com/t-products_1_.aspx>, 2 pages.

"Goldtouch Catalog", Goldtouch.com/resources [online] (Jul. 4, 2009) [retrieved on Jul. 18, 2011]. Retrieved from: <URL: http://web.archive.org/web/20090124110133/http:/goldtouch.com/Resources/catalog/Goldtouch_Catalog.pdf>, 16 pages.

Clawson, J., et al., "Automatic Whiteout ++: Correcting Mini-QWERTY Typing Errors Using Keypress Timing", CHI 2008 Proceedings, Florence, Italy, Apr. 5-10, 2008, pp. 573-582.

Clawson, J., et al., "Automatic Whiteout: Discovery and Correction of Typographical Errors in Mobile Text Input", Indiana University Alex Rudnick publications [online] (2007) [retrieved on Aug. 30, 2010]. Retrieved from: <URL: https://www.cs.indiana.edu/~alexr/pubs/automatic-whiteout_mobileHCI07.pdf>, 4 pages.

Clawson, J., et al., "Automatic Whiteout++: Correcting Mini-QWERTY Typing Errors using Keystroke Timing", Alex Rudnick Google pages [online] (2007) [retrieved on Aug. 31, 2010]. Retrieved from: <URL: http://alex.rudnick.googlepages.com/awpp-iswc-07.pdf>, 8 pages.

ions, a suggestion is generated that only one of the two keystrokes was intended to be input. Other embodiments of this aspect include corresponding systems, apparatus, and computer programs recorded on computer storage devices, each configured to perform the actions of the methods.

PROXIMITY BASED KEYSTROKE RESOLUTION

TECHNICAL FIELD

This document relates to resolving keystrokes input into a keyboard.

BACKGROUND

More and more people type information into electronic devices using keyboards for various work-related and personal reasons throughout their day, whether using a personal computer, laptop, or mobile communication device, to name a few examples. People have begun to expect a certain level of auto-correction of typographical errors when they are typing. The challenges of typing without error are further compounded when using a small-sized keyboard, for example, as found on a mobile communication device, such as a smartphone, or app phone. Since keys on such keyboards are typically much smaller than the average fingertip, two or more keys can accidentally be pressed when by a user intending to input a single character.

SUMMARY

This specification describes technologies relating to resolving keystrokes. In general, one aspect, the subject matter described in this specification can be embodied in methods for resolving keystrokes which include receiving a first keystroke and a second keystroke input by a user on a keyboard. The first keystroke corresponds to a first key on the keyboard and the second keystroke corresponds to a second key on the keyboard that is different from the first key. The first keystroke and the second keystroke are determined to have been input at substantially the same time and the first key is determined to be adjacent the second key on the keyboard. In response to the determinations, a suggestion is generated that only one of the two keystrokes was intended to be input. Other embodiments of this aspect include corresponding systems, apparatus, and computer programs recorded on computer storage devices, each configured to perform the actions of the methods.

These and other embodiments can each optionally include one or more of the following features, alone or in combination. The suggestion can be communicated to the user. Communicating the suggestion to the user that only one of the two keystrokes was intended to be input can include determining one or more permutations of character strings that include either a first character corresponding to the first key or a second character corresponding to the second key and one or more characters input by the user immediately preceding the two keystrokes. A probability for each of the one or more permutations that the permutation was the character string intended to be input by the user can be determined. One or more suggested character strings based on the determined probabilities can be displayed to the user on a display device.

The first character and the second character preceded by the one or more characters input previously by the user can be displayed on the display device. An input can be received from the user selecting one of the suggested character strings. The characters input by the user can be replaced with the selected suggested character string.

The one or more suggested character strings can include a permutation having at least some of the characters reordered from the order in which they were input by the user.

Determining one or more permutations of character strings that include either the first character or the second character and one or more characters input by the user immediately preceding the two keystrokes can include determining permutations having at least one of the characters in the string replaced by a proximal character. A proximal character is a character that corresponds to a key on the keyboard adjacent a key that corresponds to the character input by the user.

An input can be received from the user indicating a termination of a character string. Permutations of character strings that include either a first character corresponding to the first key or a second character corresponding to the second key and one or more other characters input by the user in the same character string can be determined. For each permutation, a probability can be determined that the permutation is the character string intended to be input by the user. If the permutation with the highest probability has a probability exceeding a predetermined threshold confidence, then the permutation with the highest probability can be selected and automatically replace the characters input by the user. Otherwise, one or more suggested character strings based on the probabilities can be displayed to the user.

A second set of permutations of character strings that include both the first character and the second character and one or more other characters input by the user in the same character string can be determined. For the each of permutations in the second set, a probability that the permutation is the character string intended to be input by the user can be determined. One or more of the most probable of the second set of permutations of character strings can be suggested to the user in addition to the one or more most probable permutations that include only the first character or the second character.

A third keystroke corresponding to a third key input by the user on the keyboard can be received. A determination that the third keystroke was input at substantially the same time as the first and second keystrokes and that the third key is adjacent at least one of either the first key or the second key can be made. In response to the determination, a suggestion can be generated that only one of the three keystrokes was intended to be input.

The systems and techniques described herein can include one or more of the following advantages. A typing mistake incurred by a user inadvertently pressing two or more keys on a keyboard, which can be a frequent error if using a small-sized keyboard (e.g., a real or virtual keyboard on a mobile electronic device), can be quickly identified and corrected. A user can be presented with one or more suggested options to replace what he has typed, and can easily select an option with minimal effort. For example, if using a device that has a touch screen, a user can touch the screen to select a character string to replace what he typed in error. Alternatively, the character string as typed can be automatically corrected with no further input from the user.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1A:
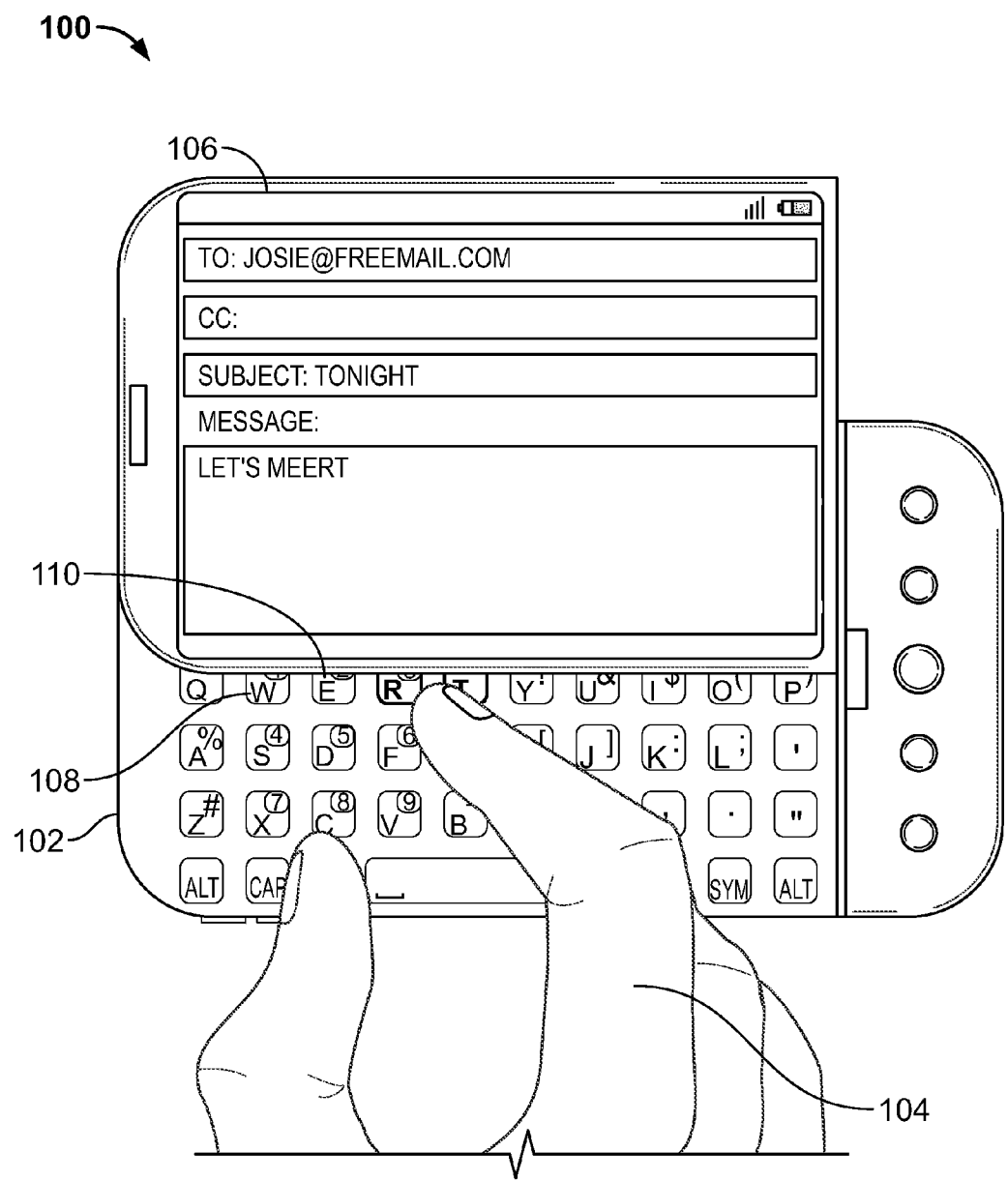
FIG. 1A is a conceptual diagram of an example electronic device for resolving keystrokes.

FIG. 1A is a conceptual diagram of an example electronic device that can be used to implement a keystroke resolution system. In the example shown, the electronic device 100 is a mobile communication device (e.g., a mobile telephone) that includes a keyboard 102. Due to the mobile nature of the device, the keyboard 102 is relatively small as compared to the user's hand. Unlike a full-sized keyboard used with a personal computer, each key is smaller than the pad of a typical adult user's finger. As such, errors due to a finger accidentally pressing two or more keys at the same time (or substantially the same time) can occur frequently. Systems and techniques are described here to identify and resolve these types of typographical errors.

The systems and techniques described can be used with either a hard keyboard or a soft keyboard. A hard keyboard is a keyboard with keys that must be pressed by a user to select a key and input a keystroke. A soft, or virtual, keyboard is a keyboard image shown on a touchable display screen (touch screen). Images of keys are depicted, which the user can touch (via a touch sensitive overlay, such as a capacitive screen) to select a key and input a keystroke. However, unlike a hard keyboard, a user typically does not select two keys at once when using a soft keyboard. If the user touches a spot on the keyboard image that is between two keys, usually the closest key to the touch is assumed to be the intended keystroke, and two keystrokes are not received as input for a single touch. However, in some instances, a soft keyboard may interpret a touch between two keys as inputting two keystrokes corresponding to the two keys. Additionally, in some instances, the user may actually press the keyboard twice, thereby inadvertently inputting two keystrokes corresponding to two adjacent keys nearly simultaneously. In such instances, the systems and techniques described can be use to resolve the keystrokes.

Referring to FIG. 1A, the user is using an e-mail application executing on the mobile electronic device 100 to input text into an e-mail message using a keyboard 102. The user is attempting to type the word "meet" and has accidentally pressed both the "r" and "t" keys with his finger 104, which are adjacent each other on the keyboard, instead of just the "t" key. The keys were pressed simultaneously or nearly simultaneously, and as shown on the display screen 106, the input reads "meert" rather than "meet".

As shall be described further below, the timing of the two keystrokes and the location of the two corresponding keys on the keyboard 102 can be used to identify that the user pressed two adjacent keys at nearly the same time. This information can be used to generate suggested replacement character strings if a spelling error is detected, or to perform an auto-correct of the typed characters, where the two keystrokes are treated as a single keystroke. That is, the two characters that were input as a result of the two keystrokes, the "r" and the "t", can be coalesced into a single entity containing both the characters. A character string correction algorithm can treat them as a single character that could be either "r" or "t", or in some implementations a different character that corresponds to a different proximate key, when attempting to resolve a detected spelling error.

Figure 2:
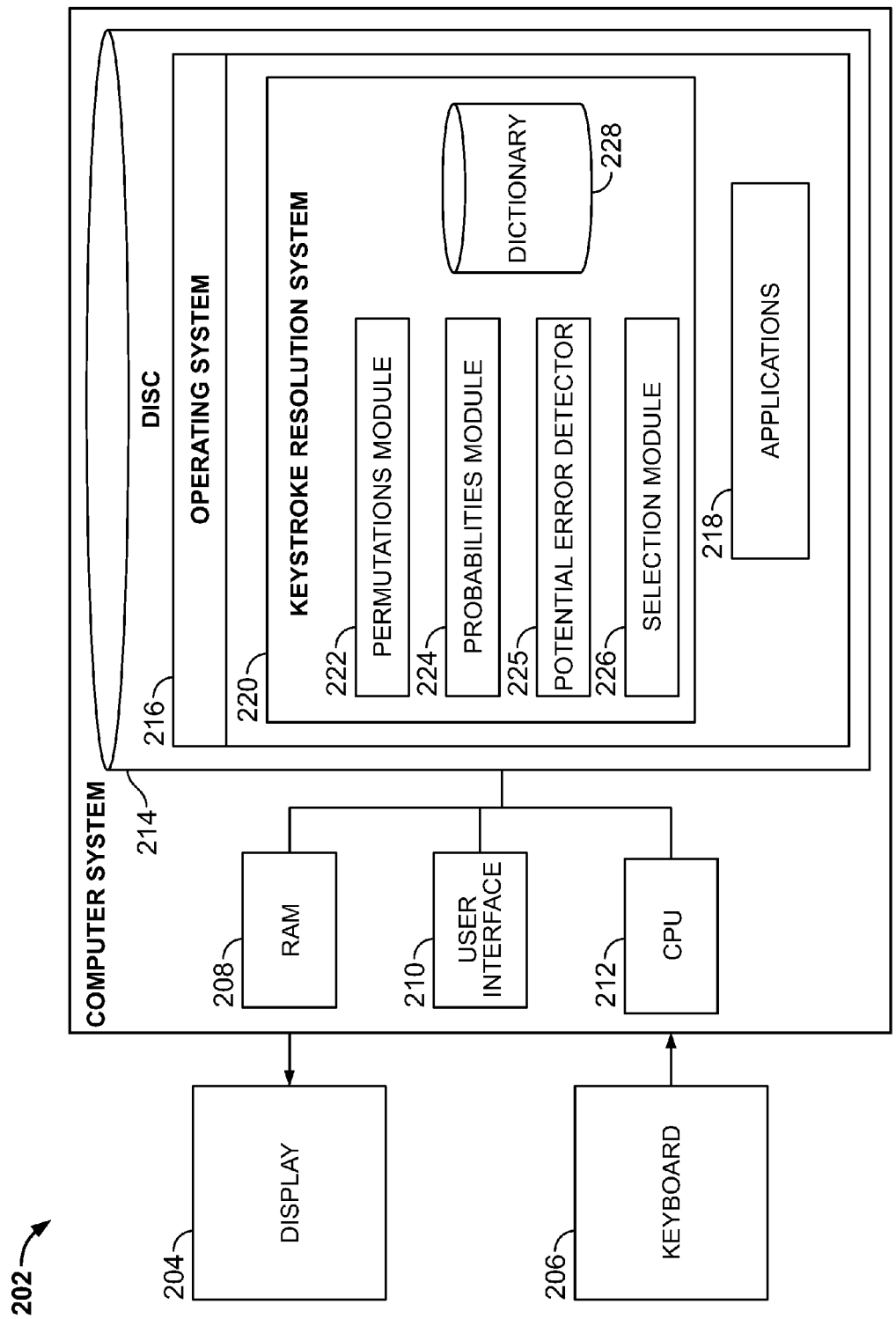
FIG. 2 is a block diagram of an example system for resolving keystrokes.

Referring now to FIG. 2, a schematic representation of an example system 200 that can be used to implement the keystroke resolution process described herein is shown. The system shown is simplified for illustrative purposes, and it should be understood that the system can be implemented over multiple computers that can be physically located at more than one location. The system 202 includes a computer system 202 that is operatively connected to a display device 204 and a keyboard 206. The example computer system 202 shown includes a RAM (random access memory) 208, user interface 210 and CPU (central processing unit) 212 and a disc 214. The disc 214 stores code for an operating system 216 and applications 218. The applications 218 can include various applications that receive user input by a keyboard, for example, a word processing application, an e-mail application, a web browser application, or a calendar application. With reference to the example shown in FIG. 1A, the particular application implementing the keystroke resolution process is an e-mail application.

The computer system 202 further includes a keystroke resolution system 220. In this implementation, the keystroke resolution system 220 includes a potential error detector 225, permutations module 226, a probabilities module 228, a selection module 230 and a dictionary 228. The potential error detector 225 is configured to detect that two keystrokes were input within a predetermined time interval that suggests that the corresponding keys were pressed simultaneously or near simultaneously, and that the two keys are within a predetermined proximity to each other on the keyboard 206. For example, the predetermined proximity can require the two keys be adjacent each other.

The predetermined time interval can be selected to be sufficiently short, so as to detect instances of a finger pressing two keys together accidentally, as compared to the finger deliberately pressing two adjacent keys one after the other. By way of illustration, consider that an average typist typing on a full-sized keyboard can type at a rate of 60 words per minute (wpm), where each word has an average of five characters, and therefore a total of 6 downward keystrokes, if you count the space-bar or punctuation keystroke following each word. Therefore, 60 wpm translates to approximately 360 keystrokes/minute or one keystroke every 167 milliseconds (ms). Therefore, if a user is typing in a consistent, deliberate manner, he or she will type one keystroke approximately every 167 ms. Typing on a small-sized keyboard, e.g., the mobile telephone keyboard 102, is typically slower than on a full-sized keyboard. In either case, if a user accidentally presses two or more keys at the same time, which has a high likelihood of leading to a typographical error, the two (or more) corresponding keystrokes will be input near simultaneously, i.e., within a much smaller interval than 167 ms. In some implementations, the predetermined time interval is set to 50 ms. That is, if two keystrokes are input at approximately the same time, they will be input less than 50 ms apart from one another.

If a potential error is detected, the permutations module 222 can determine permutations of the characters received forming a character string, with the characters input by the two simultaneous keystrokes treated as a single character. For example, referring again to FIG. 1A, the user has input the character string MEERT. A character string is a set of one or more characters that follow a word separator, e.g., a space or punctuation mark, or are otherwise identifiable as forming a word or portion of a word. In this example, the first character in the string M immediately precedes a space after the word "Let's", indicating the beginning of a new word or character string. If the two characters input by the simultaneous keystrokes, i.e., the R and T, are treated as two separate characters, then a word correction algorithm looks for 5-character strings when searching for a replacement string. However, since the user was attempting to type the 4-letter word MEET, such an approach would lead to erroneous results. The permutations module 222 is configured to treat the two simultaneously-input characters as a single character and determines at least the following two character string permutations: MEET and MEER.

The permutations can be checked against entries in one or more dictionaries, represented in the system as dictionary 228, for a match. More than one match can be found. The probabilities module 224 can determine a probability that each match is the correct character string. For example, immediately after inputting the R and T, but before inputting a space, or other indicator of a word termination, it is not known if the characters in the string represent the beginning of a word or an entire word. The dictionary 228 can include the entry MEET for the 4-letter word "meet", but can also include the entry MEERKAT, i.e., the small mammal belonging to the mongoose family. It is possible the user was beginning to type the word MEERKAT. The probabilities module 224 can determine probabilities that the user was intending to input MEET and MEERKAT. In this example, since "meet" is a word occurring much more frequently in the English language than "meerkat", the character string "meet" is given a higher probability than the character string "meer".

In some implementations, the permutations module 222 determines permutations that include replacing one or more of the other characters in the string with a character corresponding to a key that is proximate on the keyboard 206 to the key corresponding to the character that was actually input. For example, referring to the keyboard 102 in FIG. 1A, the key 108 corresponding to the character W is adjacent the key 110 corresponding to the character E. The permutations module can substitute the character W for instances of the character E when determining the various possible permutations of the character string. An example of some of the permutations that can be determined by the permutations module 222 is shown in Table 1 below.

TABLE 1

| 1 | M | E | E | R |
| 2 | M | E | E | T |
| 3 | M | E | E | G |
| 4 | M | E | E | F |
| 5 | M | E | E | E |
| 6 | M | E | E | Y |
| 7 | M | W | E | T |
| 8 | M | E | W | T |
| 9 | M | W | E | R |
| 10 | M | E | W | R |
| 11 | N | E | E | T |
| 12 | N | E | E | R |
| 13 | J | E | E | T |
| 14 | J | E | E | R |
| 15 | M | R | E | T |
| 16 | M | E | R | T |

The permutations in Table 1 above do not show an exhaustive list, but are representative of some of the permutations that can be determined by replacing various of the characters with characters corresponding to adjacent keys on the keyboard. In the examples above, the $4^{th}$ character in the string is either an R or a T but not both, or is a character corresponding to a key adjacent to either the R or the T on the keyboard, e.g., an E, F, G or Y. In this example, the character string with the highest probability of being the correct string is the second row in Table 1, that is, the word "meet". The probability can be higher if less of the originally input characters are replaced (i.e., the "delta" is lower). For example, the string MEET has only the 4-th character corrected by selecting between either R or T. By contrast, the string MEWT in row 8 has the $3^{rd}$ character, which was input as an E replaced with a W and the $4^{th}$ character, which was input was R/T replaced with T—therefore 2 deltas. In a given permutation, the number of characters that are substituted for the actual characters input can lower the probability that the permutation is the correct string. In some implementations, the word correction algorithm can generate permutations based on assuming that one or more characters have been transposed, e.g., that the user input the $1^{st}$ character and the $2^{nd}$ character out of order, and generate permutations to account for both possibilities.

The selection module 226 can be configured to select one or more of the permutations based on their corresponding probabilities. If a word terminator has been received, for example after the user inputs a space following the character T, then the selection module 226 can determine whether one of the permutations has a probability meeting a threshold confidence level, and if so, automatically correct the character string. That is, the character string MEERT can be replaced with the character string MEET automatically after receiving the spacebar keystroke input by the user. If the probability that MEET was the correct character string was not high enough, then the selection module 226 can select to display the permutation as a suggested character string on the display screen 204, perhaps along with one or more other suggested character strings having relatively high probabilities.

In some implementations, the dictionary 228 can be a dynamically updated dictionary, stored either on the device itself or a remote system. The terms in the dictionary and the probabilities of the occurrences of those terms may be updated periodically, for example, using search query submission information for a public search engine, by using new story information, or by other mechanisms. For example, when a natural disaster or similar event occurs, many users of a search engine begin to submit queries regarding the location of the disaster and other related topics so that they can learn more about the situation. In a like manner, the user of a particular device may be assumed to be more likely to enter such terms based on a general public level of interest in such events. As a result, the new terms may be added to the user's dictionary 228, at least temporarily, and/or their probabilities may be increased. Various mechanisms may be used so as to properly blend the probabilities of "background" terms in the dictionary that are normal parts of the language whose popularity does not change much over time, with "transient" terms whose probabilities should be raised for a time period but then trend back to their regular levels.

Figure 1B:
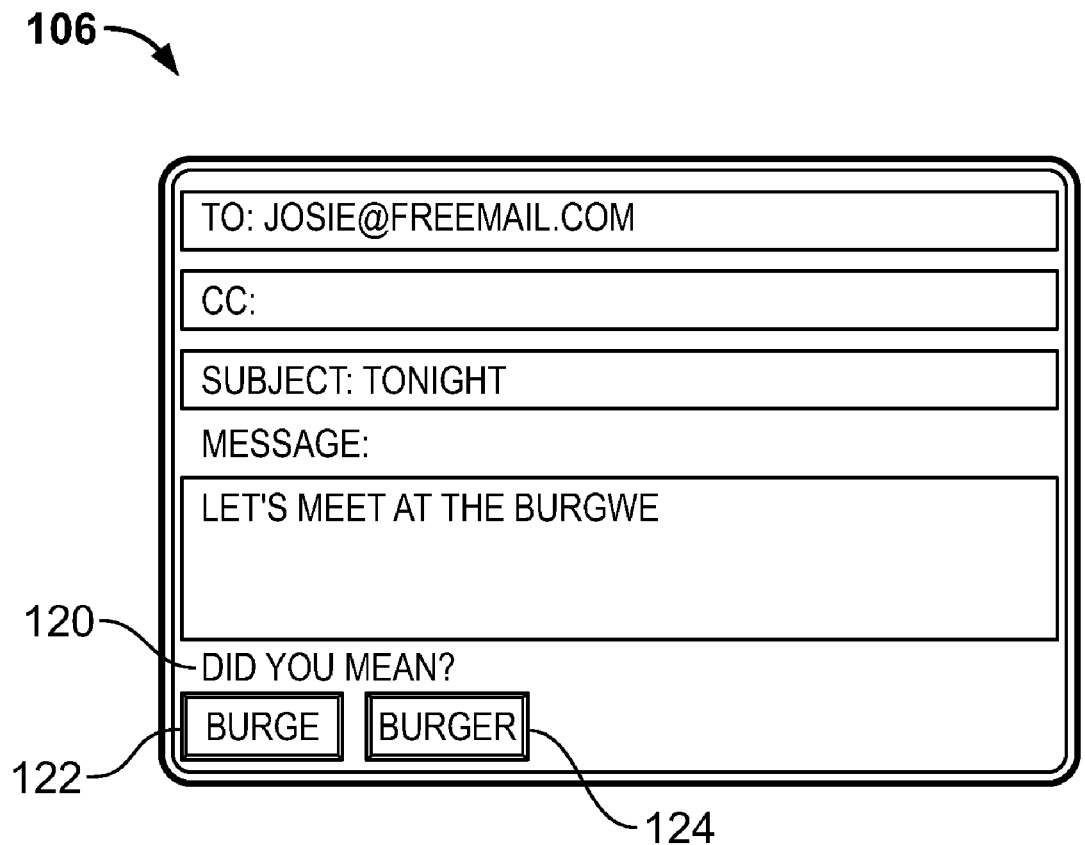
FIG. 1B shows an example screen shot from the display of the system shown in FIG. 1A.

A second illustrative example is shown in FIG. 1B. In this example, the user has input additional keystrokes, the most recent corresponding to the characters W and E. The W and E characters correspond to adjacent keys on the keyboard, and in this example were input within 50 ms of each other. The potential error detector 225 has therefore detected that the W and E potentially have erroneously been input as two characters when only one character was intended. The permutations module 222 can determine permutations of 5-character strings, where the 5th character is either a W or an E but not both, or can be another character that corresponds to a key adjacent to either the W or E keys on the keyboard.

The system can also be configured to determine word completion permutations. In this example, the permutation module determines as one permutation the character string BURGE. The dictionary does not include an entry for BURGE but does include an entry for BURGER. Since a word terminator has not been received as input, i.e., the user has not pressed a space bar or input a punctuation mark following the E input, the string BURGER is a probable word completion for the characters already received as input. In some implementations, word completions can be suggested to the user in addition to one or more suggested permutations of the characters input by the user, e.g., by displaying them on the display screen. In the example shown, the text "Did you mean?" 120 is displayed to the user beneath the field where he is typing, and two suggested character strings are shown, BURGE 122 and BURGER 124. If the display screen 106 is a touch screen, the user can touch one of the suggested strings to select the string to replace what was typed, otherwise, the user can use a different type of input mechanism to make the selection (e.g., a roller ball).

If the user does not make a selection, but his next keystroke correspond to the character R followed by a word terminator (e.g., a space), the system can determine that the probability the $5^{th}$ character was supposed to be the character E is high enough that the string BURGWER is automatically corrected and changed to BURGER. That is, inputting the word terminator (pressing the spacebar) can trigger the selection module 226 to enter an auto-correct mode, if a suggested permutation has a probability exceeding a predetermined threshold confidence. In this example, the selection module finds BURGER to have a high enough probability to automatically correct the character string without requiring additional input from the user.

Figure 3:
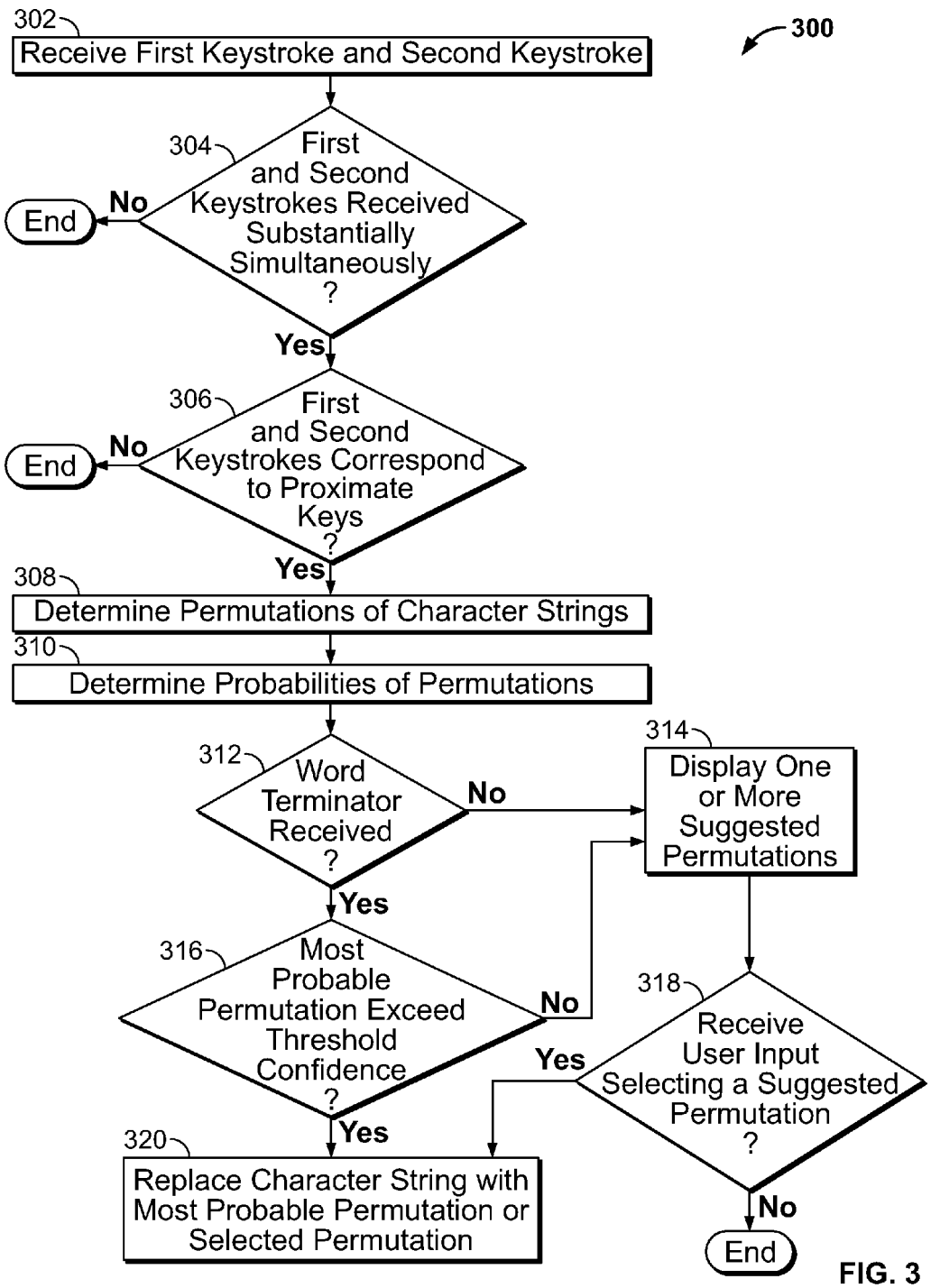
FIG. 3 is a flow chart of an example process for resolving keystrokes.

FIG. 3 is a flow chart of an example process 300 for resolving keystrokes. For illustrative purposes, the process 300 can be described in reference to the example system 200 shown in FIG. 2 and the example mobile electronic device 100 shown in FIG. 1. However, it should be understood the process 300 can be implemented using a differently configured system or device.

To start the example process, a first keystroke and a second keystroke are received (box 302), such as on a physical or virtual keyboard. For example, referring to FIG. 1B, the first keystroke can correspond to the character W and the second keystroke can correspond to the character E. A determination is then made whether the first and second keystrokes were received substantially simultaneously (box 304). For example, if the second keystroke was input within a predetermined time interval of the first keystroke, e.g., within 50 ms, then the second keystroke can be determined to have been input substantially simultaneously with the first keystroke ("Yes" branch of box 304). If the first and second keystrokes were not input substantially simultaneously ("No" branch of box 304), then the process can terminate with respect to these two keystrokes.

If the first and second keystrokes were input substantially simultaneously, a determination can be made whether they correspond to keys that are proximate each other on the keyboard (box 306). It should be understood that the order of the steps can be different, for example, the actions of box 306 can occur before those of box 304. In this example, a proximate key refers to an adjacent key on the keyboard. The determination can be made by the potential error detector 225. In some implementations, keyboard information is stored and can be checked to determine the relative location of keys to one another, since not all keyboards have the same arrangement. Information about the keyboard 206 for the particular system 200 can be accessed to determine whether the E key is adjacent the R key, if the E keystroke was received within the predetermined time interval with the R keystroke. In one example, an electronic file, e.g., an XML file, can be used that specifies the positions and sizes of keys included in the keyboard, from which a determination can be made whether two keys are adjacent each other.

If the first and second keystrokes do not correspond to proximate keys ("No" branch of box 306), then the process can terminate with respect to these two keystrokes. If the process 300 terminates with respect to these two keystrokes, and a new keystroke is received, the process can begin again for a second iteration. In the second iteration, the new keystroke is the "second keystroke" and the second keystroke from the previous iteration is now the "first keystroke".

Referring again to FIG. 3, if the first and second keystrokes do correspond to proximate keys ("Yes" branch of box 306), then the permutations of character strings made up of the characters input by the user can be determined (box 308). For example, the permutations module 222 can determine strings having 5 characters based on the received input of BURG and W/E, where the W/E inputs are treated as a single character. As discussed above, different characters can be substituted for one or more of the other characters as well, based on key proximity, e.g., the B can be replaced with a V, G or N—which correspond to keys adjacent the B-key on the keyboard.

In some implementations, permutations can also be determined that take into account the possibility that the W and E inputs were intended as two separate inputs and that the character string is a 6-character string and not a 5-character string. For example, a first set of permutations can be determined for 5-character strings where the W/E inputs are treated as a single character. A second set of permutations can be determined for 6-character strings, e.g., the following:

BURGEE (the W is replaced with an E corresponding to a proximate key);
BURGEW (the W is replaced with an E corresponding to a proximate key and the E is replaced with a W corresponding to a proximate key);
BURGWW (the E is replaced with a W corresponding to a proximate key);
BURGWR (the E is replaced with an R corresponding to a proximate key);
BURGER (the W is replaced with an E corresponding to a proximate key and the E is replaced with an R corresponding to a proximate key).

In a next step, probabilities of the permutations are determined (box 310). For example, the probabilities module 224 can compare the permutations to entries in the dictionary 228 and determine a probability that the permutation is the correct character string. In implementations where permutations are determined for both the scenario where the two keystrokes are treated as a single input and the scenario where the two keystrokes are treated as two inputs, a different weighting can be applied to the two sets of permutations. That is, a higher weighting can be applied to the probabilities of the character strings in the first set (i.e., the permutations with 5-characters) as compared to a weighting applied to the probabilities of the character strings in the second set (i.e., the permutations with 6-characters). The weighting, which can be referred to as a confidence level, can therefore favor the first scenario, but still allow for a permutation from the second scenario being selected.

If a word terminator has been received ("Yes" branch of box 312), then an auto-correct mode can be triggered. That is, if the most probable permutation has a probability exceeding a predetermined threshold confidence ("Yes" branch of box 316), then the character string input by the user can be automatically corrected with the most probable permutation (box 320). Otherwise, if the probability is too low, even for the most probable permutation, then one or more suggested permutations can be displayed to the user, without making any automatic changes to his input (box 314). The user can then input a selection of one of the suggested permutations ("yes" branch of box 318), following which input the selected permutation can replace the character string that was input by the user (box 320). If the user does not input a selection ("no" branch of box 318), the process can end.

If a word terminator has not been received ("No" branch of box 312), then one or more suggested permutations can be displayed on the display screen. For example, the selections module 226 can select the top N permutations based on their determined probabilities to be displayed on the display 204 for presentation to the user. Referring again to FIG. 1B, an example screen shot is shown where two permutations are displayed to the user: BURGE and BURGER. This screen shot was discussed above in the context of suggesting a word completion, i.e., completing the string BURGE with an R to form the word BURGER. However, this screen shot can also be used to illustrate an example where both 5-character and 6-character strings are determined by the permutations module 222. In this example, the 5-character string BURGE and the 6-character string BURGER (determined by replacing the W with an E corresponding to the adjacent E key and replacing the E with an R corresponding to the adjacent R key) are the two permutations with the highest probabilities, after applying a higher confidence level to the 5-character permutations.

After the one or more suggested permutations are displayed to the user, the user may select one of the suggested permutations (i.e., "yes" branch of box 318) and the character string is replaced (Box 320), or not (i.e., "no" branch of box 318) and the process with respect to these two keystrokes ends. A user may next input a new keystroke and the process can begin again for a next iteration, where the new keystroke is the "second keystroke" and the previously input keystroke (i.e., the second keystroke in the last iteration of the process) now becomes the first keystroke. That is, a character corresponding to the new keystroke can be used to determine permutations of the now-lengthened character string. If the new keystroke is a word terminator, e.g., a space or punctuation mark, then an auto-correct mode can be triggered, and if the most probable permutation determined in the previous iteration exceeded a threshold confidence, the characters can automatically be corrected to correspond to the most probable permutation of the character string.

The process 300 can be used to resolve more than one keystroke error in one word. That is, the process 300 can be used as described above to resolve the W/E input error in the character string BURGE. The user can then input a new keystroke, to complete the word, and instead of pressing R may press R/T, i.e., two adjacent keys, substantially simultaneously. In a subsequent iteration of the process, the R/T keystrokes can also be resolved.

The process 300 was described in the context of receiving two keystrokes corresponding to adjacent keys on a keyboard substantially simultaneously. However, it should be understood the process 300 can be used in the context of receiving more than two keystrokes in this manner. A user inputting keystrokes into a small keyboard may press three (or even more) keystrokes substantially simultaneously. For example, when attempting to input the character D, the user may press D, S and E at substantially the same time. The process 300 can be used to resolve such an error. For example, in Box 304 the first, second and third keystrokes can be determined to be received substantially simultaneously and in Box 306 the three keystrokes can be determined to correspond to proximate keys on the keyboard. The three characters D/S/E can be treated as a single character for the purpose of determine permutations of character strings that include either D, S or E but not all three, in a similar manner as described in the two character example.

In some implementations, in addition to determining permutations where the simultaneous keystrokes are treated as a single input (i.e., the 5-character permutations in the above example), word completions can be determined. For example, as previously discussed in reference to FIG. 1B, since the character string BURGE is not a word in the dictionary 228, a word that begins with that character string can be found in the dictionary 228, i.e., the word BURGER. Permutations determined to complete words can form a third set of permutations. In the above example, the word was completed by adding a character to the end of the character string. In other examples, a word can be completed by adding a character to a different position in the word. For example, if a user inputs URGER, a comparison to entries in the dictionary 228 can determine, with a high probability, that the correct character string begins with the character B and complete the word by adding a B to the beginning of the string.

For purposes of determining the probability of the permutation being the correct character string, a different level of confidence, i.e., weighting, can be applied to probabilities for permutations determined treating the simultaneous keystrokes as a single input than for permutations determined by adding one or more characters (i.e., word-completion-permutations). In some implementations, the highest confidence is given to the first set of permutations (i.e., character strings formed from the characters input by the user together with the simultaneous keystrokes treated as a single input), the next highest confidence is given to the second set of permutations (i.e., character strings formed using the characters input by the user and treating the simultaneous keystrokes as two inputs) and the lowest confidence is given to the word-completion-permutations. The permutations determined in all three sets can be merged to generate a selection of permutations ranked with the most probable permutations at the top of the selection.

Figure 4:
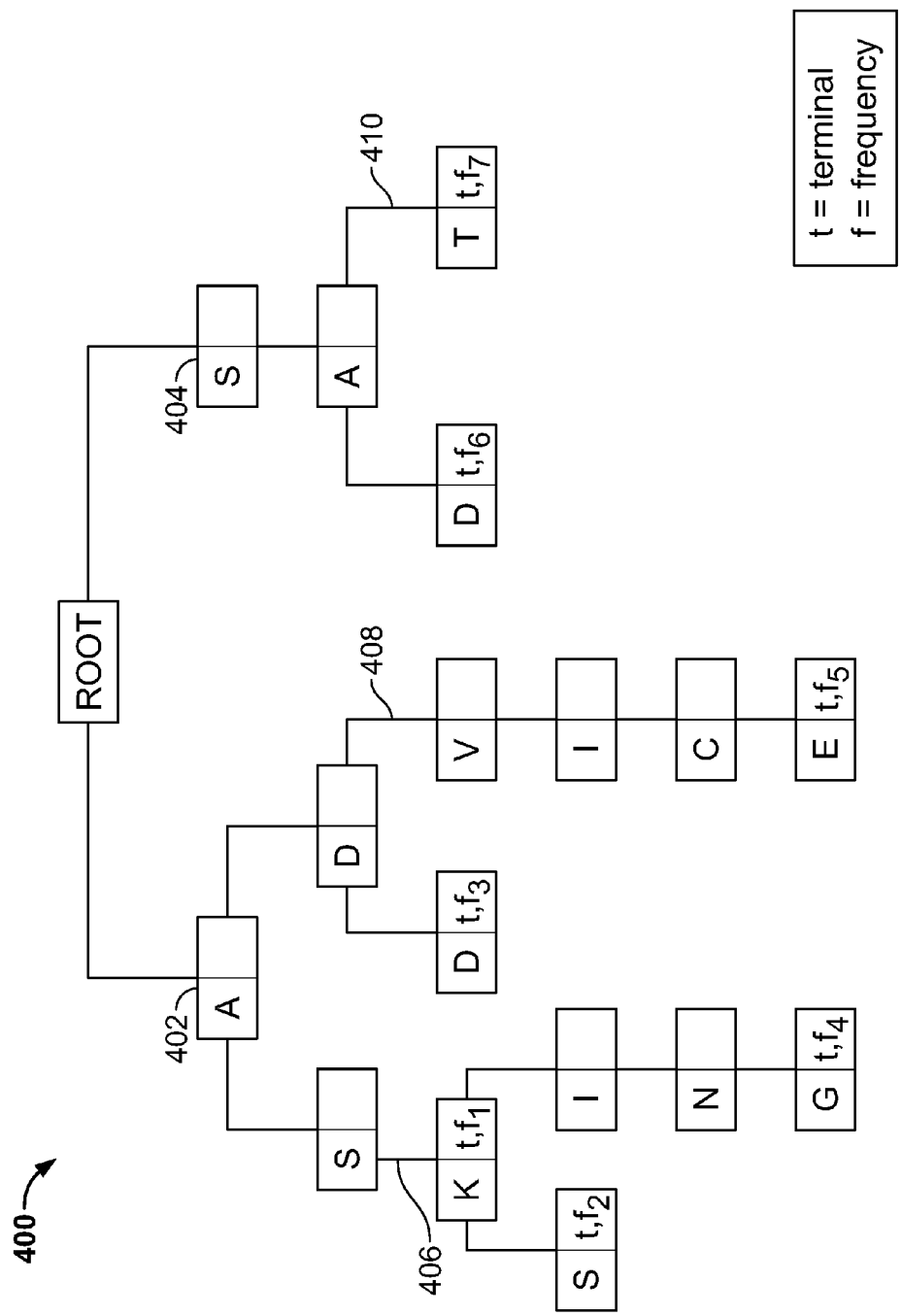
FIG. 4 is a schematic representation of a portion of a prefix tree dictionary.

The process 300 described above and the system 200 shown in FIG. 2 can be implemented using one or more dictionaries. In some implementations, the dictionary is structured as a prefix tree dictionary, which (optionally) can be read directly off flash memory included in an electronic device, e.g., in device 100 shown in FIG. 1A. FIG. 4 shows a portion of an example prefix tree dictionary 400. The portion shown is simplified and was selected for illustrative purposes, to be discussed in reference to the following example. In the example, the user inputs three keystrokes corresponding to the characters A, S and D. For simplicity, the example is described in terms of searching the tree for a 3-character string. However, if two of the keystrokes were input simultaneously, e.g., the S and D, because they correspond to adjacent keys on the keyboard, the tree can be searched for 2-character strings. That is, the S/D keystrokes can be treated as one input rather than two.

Returning to the example, as shown in FIG. 4, the dictionary includes the words ASK, ASKS, ADD and ADVICE beginning with the character A 402 and includes the words SAD and SAT beginning with the character S 404. Words beginning with the character A are searched in the prefix tree 400 because the user's first input corresponds to the character A. However, the key for A is adjacent to the key for S on the keyboard, so words beginning with the character S are also searched.

When traversing the prefix tree 400, the paths for ASK* 406, ADV* 408 and SAT 410 are eliminated as bad paths. The third character input by the user was a D. The D key is not proximate to (i.e., adjacent) either the K, V or T keys, so words having either of those characters in the third-letter-position (i.e., ASK*, ADV* and SAT) are eliminated. The word ADD is not eliminated because: the first character corresponds to the user input (A); the second character corresponds to the D key which is adjacent the S key on the keyboard, where S was the user input; and the third character also corresponds to the user input (D). The word SAD is not eliminated because: the first character corresponds to the S key which is adjacent the A key on the keyboard, where A was the user input; the second character corresponds to the A key which is adjacent the S key on the keyboard, where S was the user input; and the third character corresponds to the user input (D).

Each word in the prefix tree 400 can include (or be associated with) a frequency of the word occurring (shown as f in FIG. 4). In this example, the frequency for ADD ($f_3$) is 200 and the frequency for SAD ($f_6$) is 200, that is, they have the same frequency. The frequency can be used as a basis for determining the probability that the word is the correct character string. However, other factors can be used to boost the probability. For example, the number of "deltas" for each word can boost the word's probability. As discussed above, a delta refers to the number of characters in the word that are changed as compared to the user's input. In this example, the user input the characters ASD, and therefore the word ADD has 1 delta and the word SAD has 2 deltas. Since ADD has more characters in common with the user input ASD, the probability for ADD is higher than for SAD. Therefore, in this example, the word ADD is selected as the most probable character string to correct the user input of ASD. As noted above, the dictionary may also be a dynamic dictionary, in that the terms in the dictionary and the probabilities or those terms may be updated in response to current events, such as the text in news stories or in user-submitted queries to a search engine.

Figure 5:
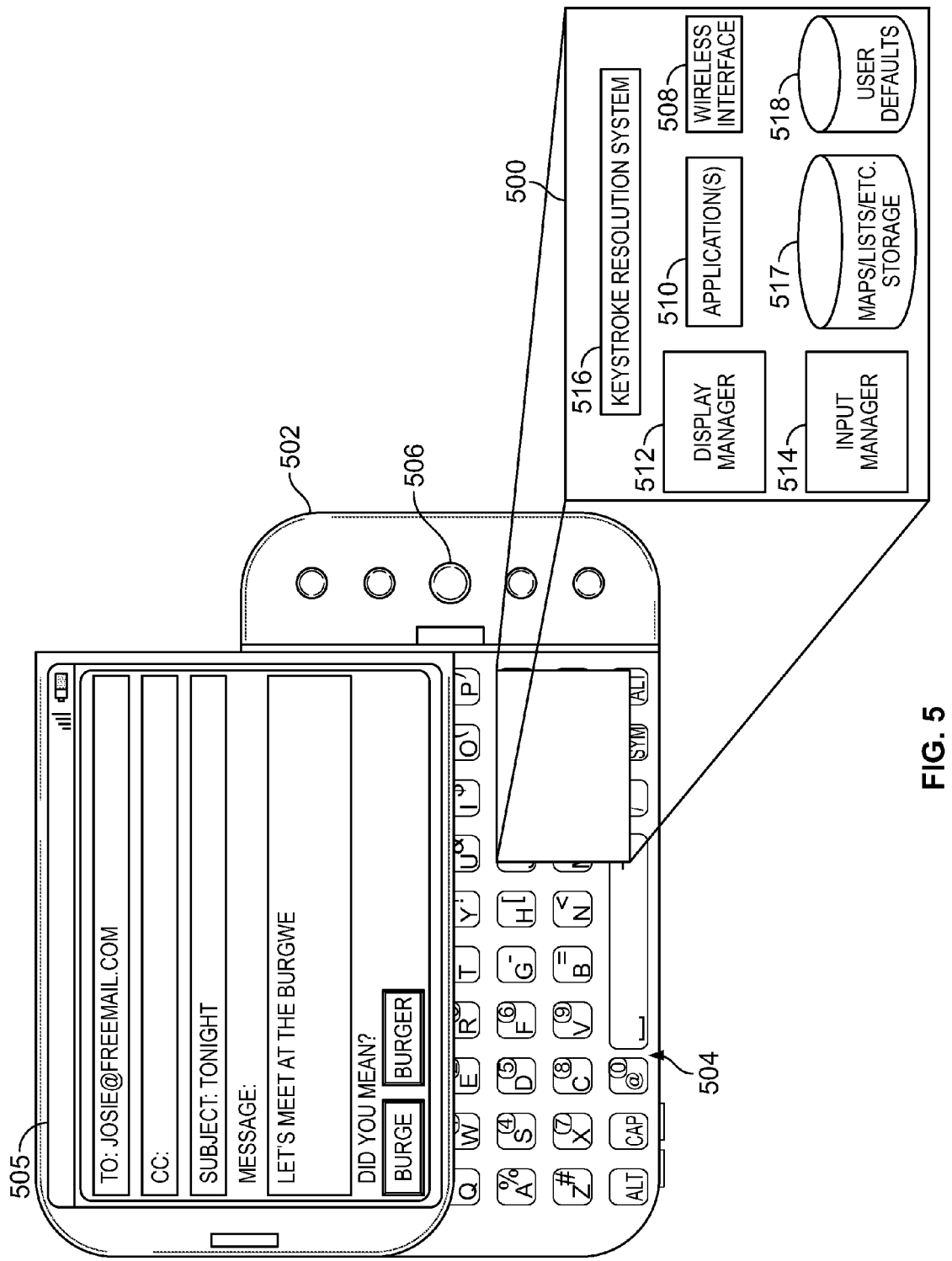
FIG. 5 is a schematic representation of an example system including the system for resolving keystrokes shown in FIG. 2.

FIG. 5 is a schematic diagram of an example system 500 that provides user interaction in response to touch screen inputs. The system 500 may be implemented using a mobile electronic device such as device 502. The device 502 includes various input and output mechanisms such as a touch screen display 505 and a roller ball 506. A number of components within device 502 may be configured to provide various selection functionality on display 505, such as keystroke resolution for simultaneously entered keystrokes, as discussed above.

One such component is a display manager 512, which can be responsible for rendering content for presentation on display 505. The display manager 512 can receive graphic-related content from a number of sources and can determine how the content is to be provided to a user. For example, a number of different windows for various applications 510 on the device 505 may need to be displayed, and the display manager 512 may determine which to display, which to hide, and what to display or hide when there is overlap between various graphical objects.

The display manager 512 can include various components to provide the device 502 with particular functionality for interacting with displayed components, which may be shared across multiple applications, and may be supplied, for example, by an operating system of device 502.

Individual applications 510 can register themselves with the display manager 512 in accordance with an API so as to indicate the sort of display elements they might require. An input manager 514 may be responsible for translating commands provided by a user of device 502. For example, such commands may come from a keyboard, from touch screen display 505, from roller ball 506, or from other such sources, including dedicated buttons or soft buttons (e.g., buttons whose functions may change over time, and whose functions may be displayed on areas of display 505 that are adjacent to the particular buttons). The input manager 514 may determine, for example, in what area of the display commands are being received, and thus in what application being shown on the display the commands are intended for. In addition, it may interpret input motions on the touch screen 505 into a common format and pass those interpreted motions (e.g., short press, long press, flicks, and straight-line drags) to the appropriate application. The input manager 514 may also report such inputs to an event manager (not shown) that in turn reports them to the appropriate modules or applications.

A variety of applications 510 may operate, generally on a common microprocessor, on the device 502. The applications 510 may take a variety of forms, such as mapping applications, e-mail and other messaging applications, web browser applications, music and video players, and various applications running within a web browser or running extensions of a web browser. As discussed above, applications 510 that receive input from a user typing on the keyboard 504 can resolve typographical errors using the keystroke resolution system 516. That is, keystrokes input substantially simultaneously and corresponding to adjacent keys on the keyboard 504 can be treated as a single input. The character corresponding to the single input can be resolved using various techniques, e.g., the process 300 described above in reference to FIG. 3.

A wireless interface 508 manages communication with a wireless network, which may be a data network that also carries voice communications. The wireless interface may operate in a familiar manner, such as according to the examples discussed below, and may provide for communication by the device 502 with messaging services such as text messaging, e-mail, and telephone voice mail messaging. In addition, the wireless interface 508 may support downloads and uploads of content and computer code over a wireless network.

Various forms of persistent storage may be provided, such as using fixed disk drives and/or solid state memory devices. Two examples are shown here. First, maps/lists/etc storage 517 includes all sorts of data to be used by applications 510, and can include lists of data elements, graphical components like map tiles, and a variety of other well known data structures so that a user can interact with applications on device 502.

Other storage includes user defaults 518, which may be profile information for a user stored on the same media as maps/links/etc. storage 517. The user defaults 518 include various parameters about a user of the device 502. In the example relevant here, the user profile may include data defining the manner in which the user prefers to have panning controls presented on the display 505 (e.g., what the controls should look like, whether a list should scroll with the control or in the opposite direction of the control, the actions by the user that will bring up the control, etc.).

Using the pictured components, and others that are omitted here for clarity, the device 502 may provide particular actions in response to user inputs. Specifically, the device 502 may respond to zooming and panning inputs within a large-scale graphical space in particular ways, including by displaying a navigation control that permits zooming and panning in the space.

Figure 6:
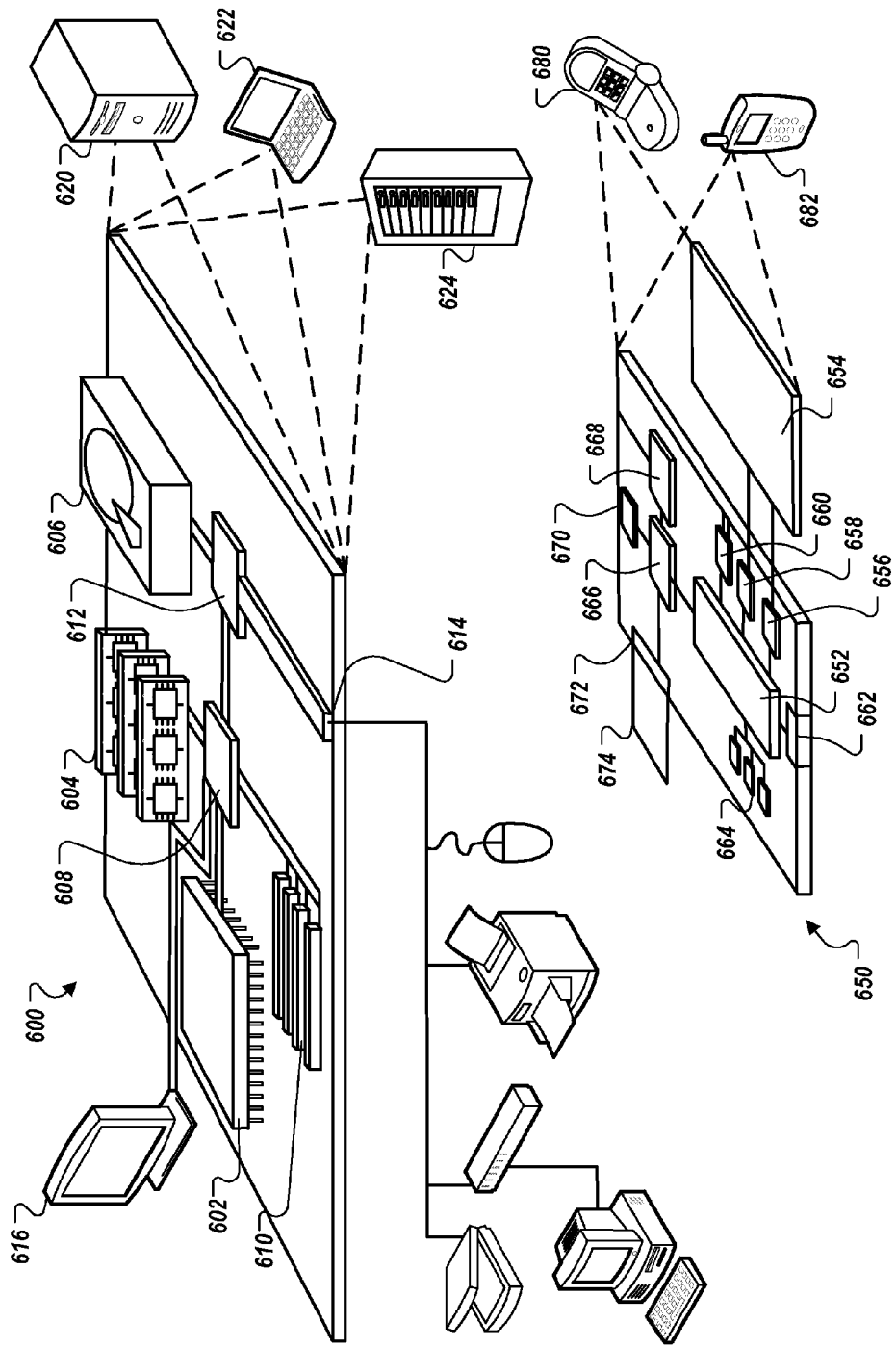
FIG. 6 shows examples of generic computer devices that may be used to execute the actions discussed in this document.

FIG. 6 shows an example of a generic computer device 600 and a generic mobile computer device 650, which can be used with the techniques described herein. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the subject matter described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various buses, and can be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses can be used, as appropriate, along with multiple memories and types of memory. Also, multiple computing devices 600 can be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 can also be another form of computer-readable medium, such as a magnetic or optical disk.

The storage device 606 is capable of providing mass storage for the computing device 600. In some implementations, the storage device 606 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also include instructions that, when executed, perform one or more methods, such as those described above. The information carrier can be a computer-readable or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which can accept various expansion cards (not shown). In the implementation, low-speed controller 612 is coupled to storage device 606 and low-speed expansion port 614. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 600 can be implemented in a number of different forms, as shown in the figure. For example, it can be implemented as a standard server 620, or multiple times in a group of such servers. It can also be implemented as part of a rack server system 624. In addition, it can be implemented in a personal computer such as a laptop computer 622. Alternatively, components from computing device 600 can be combined with other components in a mobile device (not shown), such as device 650. Each of such devices can include one or more of computing device 600, 650, and an entire system can be made up of multiple computing devices 600, 650 communicating with each other.

Computing device 650 includes a processor 652, memory 664, an input/output device, such as a display 654, a communication interface 666, and a transceiver 668, among other components. The device 650 can also be provided with a storage device, such as a microdrive or other device, to provide additional storage. Each of the components 650, 652, 664, 654, 666, and 668, are interconnected using various buses, and several of the components can be mounted on a common motherboard or in other manners as appropriate.

The processor 652 can execute instructions within the computing device 650, including instructions stored in the memory 664. The processor can be implemented as a chipset of chips that include separate and multiple analog and digital processors. The processor can provide, for example, for coordination of the other components of the device 650, such as control of user interfaces, applications run by device 650, and wireless communication by device 650.

Processor 652 can communicate with a user through control interface 658 and display interface 656 coupled to a display 654. The display 654 can be, for example, a TFT LCD (Thin-Film-Transistor Liquid Crystal Display) or an OLED (Organic Light Emitting Diode) display, or other appropriate display technology. The display interface 656 can comprise appropriate circuitry for driving the display 654 to present graphical and other information to a user. The control interface 658 can receive commands from a user and convert them for submission to the processor 652. In addition, an external interface 662 can be provide in communication with processor 652, so as to enable near area communication of device 650 with other devices. External interface 662 can provide, for example, for wired communication in some implementations, or for wireless communication in other implementations, and multiple interfaces can also be used.

The memory 664 stores information within the computing device 650. The memory 664 can be implemented as one or more of a computer-readable medium or media, a volatile memory unit or units, or a non-volatile memory unit or units. Expansion memory 674 can also be provided and connected to device 650 through expansion interface 672, which can include, for instance, a SIMM (Single In Line Memory Module) card interface. Such expansion memory 674 can provide extra storage space for device 650, or can also store applications or other information for device 650. Specifically, expansion memory 674 can include instructions to carry out or supplement the processes described above, and can include secure information also. Thus, for example, expansion memory 674 can be provided as a security module for device 650, and can be programmed with instructions that permit secure use of device 650. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer-readable or machine-readable medium, such as the memory 664, expansion memory 674, memory on processor 652, or a propagated signal that can be received, for example, over transceiver 668 or external interface 662.

Device 650 can communicate wirelessly through communication interface 666, which can include digital signal processing circuitry where necessary. Communication interface 666 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 668. In addition, short-range communication can occur, such as using a Bluetooth, WiFi, or other such transceiver (not shown). In addition, GPS (Global Positioning System) receiver module 670 can provide additional navigation-related and location-related wireless data to device 650, which can be used as appropriate by applications running on device 650.

Device 650 can also communicate audibly using audio codec 660, which can receive spoken information from a user and convert it to usable digital information. Audio codec 660 can likewise generate audible sound for a user, such as through a speaker, e.g., in a handset of device 650. Such sound can include sound from voice telephone calls, can include recorded sound (e.g., voice messages, music files, etc.) and can also include sound generated by applications operating on device 650.

The computing device 650 can be implemented in a number of different forms, as shown in the figure. For example, it can be implemented as a cellular telephone 680. It can also be implemented as part of a smartphone 682, personal digital assistant, or other similar mobile device.

Device 650 can also include one or more different devices that are capable of sensing motion. Examples include, but are not limited to, accelerometers and compasses. Accelerometers and compasses, or other devices that are capable of detecting motion or position are available from any number of vendors and can sense motion in a variety of ways. For example, accelerometers can detect changes in acceleration while compasses can detect changes in orientation respective to the magnetic North or South Pole. These changes in motion can be detected by the device 650 and used to update the display of the respective devices 650 according to processes and techniques described herein.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computer-implemented method for resolving keystrokes, the method comprising:
   receiving a first keystroke and a second keystroke input by a user on a keyboard, wherein the first keystroke corresponds to a first key on the keyboard and the second keystroke corresponds to a second key on the keyboard that is different from the first key;
   determining that the first keystroke and the second keystroke were input substantially simultaneously and that the first key is adjacent the second key on the keyboard; and in response to the determination, generating a suggestion that only one of the first keystroke and the second keystroke was intended to be input; and communicating the suggestion to the user, comprising:
determining one or more permutations of character strings that include either a first character corresponding to the first key or a second character corresponding to the second key and one or more characters input by the user immediately preceding the first keystroke and the second keystroke, including determining permutations in which at least one of the one or more characters input preceding the first keystroke and the second keystroke is replaced by a proximal character, wherein the proximal character corresponds to a third key on the keyboard adjacent a fourth key that corresponds to the replaced at least one of the one or more characters;

determining, for each respective of the one or more permutations, a probability that the respective permutation was intended to be input by the user; and displaying, to the user and on a display device, one or more suggested character strings based on the determined probabilities.

2. The method of claim 1, further comprising:
displaying, on the display device, a character string, wherein the character string includes the first character and the second character preceded by the one or more characters input by the user;
receiving an input from the user selecting one of the suggested character strings; and
replacing the displayed character string with the selected suggested character string.

3. The method of claim 1, wherein the one or more suggested character strings includes a suggested character string that includes a permutation having a plurality of characters, wherein at least some of the plurality of characters are reordered from an order in which the plurality of characters were input by the user.

4. The method of claim 1, wherein communicating the suggestion to the user comprises:
receiving an input from the user indicating a termination of a character string;
for each of the one or more permutations, determining a probability that the permutation is the character string intended to be input by the user; and
if a permutation with the highest probability has a probability exceeding a predetermined threshold confidence, then selecting the permutation with the highest probability and automatically replacing the one or more characters input by the user with a character string corresponding to the permutation with the highest probability, otherwise, displaying to the user, on the display device, one or more suggested character strings based on the determined probabilities.

5. The method of claim 4, further comprising:
determining a plurality of permutations of character strings, wherein each of the plurality of permutations of character strings includes both the first character and the second character and one or more other characters input by the user in a single character string;
for each respective of the plurality of permutations, determining a probability that the permutation from the plurality is the character string intended to be input by the user; and
suggesting one or more most probable of the plurality of permutations of character strings to the user in addition to the one or more suggested character strings based on the determined probabilities.

6. The method of claim 1, further comprising:
receiving a third keystroke corresponding to a third key input by the user on the keyboard;
determining that the third keystroke was input at substantially the same time as the first and second keystrokes and that a key corresponding to the third keystroke is adjacent at least one of either the first key or the second key; and
in response to the determination, generating a suggestion that only one of the three keystrokes was intended to be input.

7. The method of claim 1, wherein determining, for each respective of the one or more permutations, a probability that the respective permutation is the character string intended to be input by the user comprises checking each respective permutation against entries in one or more dictionaries for a match.

8. The method of claim 7, wherein at least one of the one or more dictionaries comprises a dynamically updated dictionary that has new entries added or probabilities of existing entries updated dynamically over time.

9. A computer-readable medium having instructions encoded thereon, which, when executed by a processor, cause the processor to perform operations comprising:
receiving a first keystroke and a second keystroke input by a user on a keyboard, wherein the first keystroke corresponds to a first key on the keyboard and the second keystroke corresponds to a second key on the keyboard that is different from the first key;
determining that the first keystroke and the second keystroke were input substantially simultaneously and that the first key is adjacent the second key on the keyboard; and
in response to the determination, generating a suggestion that only one of the first keystroke and the second keystroke was intended to be input; and
communicating the suggestion to the user, comprising:
determining one or more permutations of character strings that include either a first character corresponding to the first key or a second character corresponding to the second key and one or more characters input by the user immediately preceding the first keystroke and the second keystroke, including determining permutations in which at least one of the one or more characters input preceding the first keystroke and the second keystroke is replaced by a proximal character, wherein the proximal character corresponds to a third key on the keyboard adjacent a fourth key that corresponds to the replaced at least one of the one or more characters;
determining, for each respective of the one or more permutations, a probability that the respective permutation was intended to be input by the user; and
displaying, to the user and on a display device, one or more suggested character strings based on the determined probabilities.

10. The computer-readable medium of claim 9, the operations further comprising:
displaying, on the display device, a character string, wherein the character string includes the first character and the second character preceded by the one or more characters input by the user;
receiving an input from the user selecting one of the suggested character strings; and replacing the displayed character string that includes the first character and the second character preceded by the one or more characters input by the user with the selected suggested character string.

11. The computer-readable medium of claim 9, wherein communicating the suggestion to the user comprises:

receiving an input from the user indicating a termination of a character string;

for each of the one or more permutations, determining a probability that the permutation is the character string intended to be input by the user; and if a permutation with the highest probability has a probability exceeding a predetermined threshold confidence, then selecting the permutation with the highest probability and automatically replacing the one or more characters input by the user with a character string corresponding to the permutation with the highest probability, otherwise, displaying to the user, on the display device, one or more suggested character strings based on the determined probabilities.

12. The computer readable medium of claim 9, wherein determining, for each respective of the one or more permutations, a probability that the respective permutation is the character string intended to be input by the user comprises checking each respective permutation against entries in one or more dictionaries for a match.

13. The computer readable medium of claim 12, wherein at least one of the one or more dictionaries comprises a dynamically updated dictionary that has new entries added or probabilities of existing entries updated dynamically over time.

14. A system comprising:

a processor;

receiving a first keystroke and a second keystroke input by a user on a keyboard, wherein the first keystroke corresponds to a first key on the keyboard and the second keystroke corresponds to a second key on the keyboard that is different from the first key;

determining that the first keystroke and the second keystroke were input substantially simultaneously and that the first key is adjacent the second key on the keyboard; and in response to the determination, generating a suggestion that only one of the first keystroke and the second keystroke was intended to be input; and communicating the suggestion to the user, comprising:

determining one or more permutations of character strings that include either a first character corresponding to the first key or a second character corresponding to the second key and one or more characters input by the user immediately preceding the first keystroke and the second keystroke, including determining permutations in which at least one of the one or more characters input preceding the first keystroke and the second keystroke is replaced by a proximal character, wherein the proximal character corresponds to a third key on the keyboard adjacent a fourth key that corresponds to the replaced at least one of the one or more characters;

determining, for each respective of the one or more permutations, a probability that the respective permutation was intended to be input by the user; and displaying, to the user and on a display device, one or more suggested character strings based on the determined probabilities.

15. The system of claim 14, comprising:

displaying, on the display device, a character string, wherein the character string includes the first character and the second character preceded by the one or more characters input by the user;

receiving an input from the user selecting one of the suggested character strings; and replacing the displayed character string that includes the first character and the second character preceded by the one or more characters input by the user with the selected suggested character string.

16. The system of claim 14, wherein communicating the suggestion to the user comprises:

receiving an input from the user indicating a termination of a character string;

for each of the one or more permutations, determining a probability that the permutation is the character string intended to be input by the user; and if a permutation with the highest probability has a probability exceeding a predetermined threshold confidence, then selecting the permutation with the highest probability and automatically replacing the one or more characters input by the user with a character string corresponding to the permutation with the highest probability, otherwise, displaying to the user, on the display device, one or more suggested character strings based on the determined probabilities.

17. The system of claim 14, wherein determining, for each respective of the one or more permutations, a probability that the respective permutation is the character string intended to be input by the user comprises checking each respective permutation against entries in one or more dictionaries for a match.

18. The system of claim 17, wherein at least one of the one or more dictionaries comprises a dynamically updated dictionary that has new entries added or probabilities of existing entries updated dynamically over time.

* * * * *

UNITED STATES PATENT AND TRADEMARK OFFICE
CERTIFICATE OF CORRECTION

| | | |
|---|---|---|
| PATENT NO. | : 8,179,370 B1 | |
| APPLICATION NO. | : 12/703020 | |
| DATED | : May 15, 2012 | |
| INVENTOR(S) | : Amith Yamasani and Simon Arscott | |

It is certified that error appears in the above-identified patent and that said Letters Patent is hereby corrected as shown below:

In the Claims:

Column 18, line 36, in Claim 9, after "keyboard;" delete "and".
Column 19, line 42, in Claim 14, after "keyboard;" delete "and".

Signed and Sealed this
Second Day of October, 2012

David J. Kappos
*Director of the United States Patent and Trademark Office*